(No Model.)
G. H. LOMAX.
Molding Glass on Metallic Thimbles.
No. 230,709. Patented Aug. 3, 1880.
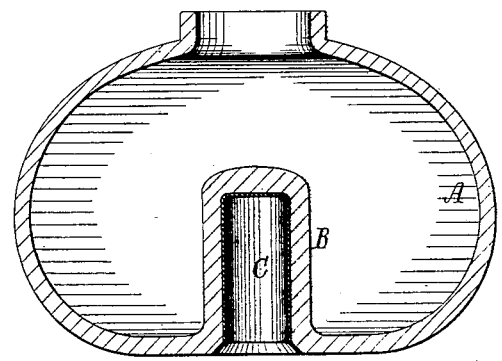
Witnesses.
J. N. Piper
[signature]
Inventor.
George Henry Lomax,
by attorney.
[signature]

UNITED STATES PATENT OFFICE.

GEORGE H. LOMAX, OF SOMERVILLE, MASSACHUSETTS.

MOLDING GLASS ON METALLIC THIMBLES.

SPECIFICATION forming part of Letters Patent No. 230,709, dated August 3, 1880.

Application filed June 14, 1880. (No model.)

*To all whom it may concern:*

Be it known that I, GEORGE HENRY LOMAX, of Somerville, of the county of Middlesex and State of Massachusetts, have invented a new and useful Improvement in Molding Glass on Metallic Thimbles or various other articles of like character; and I do hereby declare the same to be described in the following specification, reference being had to the accompanying drawing, which represents a transverse section of a glass lamp-body molded upon such a thimble or tubular socket.

The nature of my invention is set forth in the claim hereinafter presented.

In such drawing, A denotes a lamp-body having projecting up from its bottom a socketed standard, B, molded upon and about a metallic re-enforce or thimble, C, both standard and re-enforce being open at their lower and closed at their upper ends, as shown.

In attempting to press in a mold a glass lamp-body with a socketed standard upon a brass or metallic thimble or re-enforce properly sustained in the mold, I have found it very difficult, if not impossible, to do so without the glass fusing the metal and adhering more or less to its surface, and in consequence thereof cracking or breaking in numerous places while in the act of casting or setting on the re-enforce.

I have discovered, however, that by first coating the entire outer surface of the re-enforce with a heat-resisting medium—such as powdered plumbago or asbestus, for instance—the glass, on being cast in the mold and upon the re-enforce will not fuse it and adhere to it, and by reason thereof become cracked in cooling, and that it will contract firmly upon the re-enforce, and such re-enforce will remain in its normal condition.

What therefore I claim as my invention or discovery in the art of molding glass upon and around a thimble or re-enforce, as described, is—

The application of a heat-resisting coating, substantially as explained, to the re-enforce, and molding the glass directly upon such coating and about the re-enforce, as set forth, such coating, as a slow conductor of heat, operating to prevent fusing of the metal, and also to prevent the adhesion of the glass thereto, and consequent subsequent cracking of it while in the act of hardening or solidifying.

GEO. HENRY LOMAX.

Witnesses:
R. H. EDDY,
WM. W. LUNT.